United States Patent
O'Leary et al.

(10) Patent No.: US 11,426,613 B2
(45) Date of Patent: Aug. 30, 2022

(54) PERSONAL PROTECTION SUIT

(71) Applicant: DEVOL KITCHENS LTD, Leicestershire (GB)

(72) Inventors: Paul O'Leary, Leicestershire (GB); Robin McLellan, Leicestershire (GB)

(73) Assignee: DEVOL KITCHENS LTD

( * ) Notice: Subject to any disclaimer, the term of this patent is extended or adjusted under 35 U.S.C. 154(b) by 0 days.

(21) Appl. No.: 15/746,366

(22) PCT Filed: Jul. 19, 2016

(86) PCT No.: PCT/GB2016/052173
§ 371 (c)(1),
(2) Date: Jan. 19, 2018

(87) PCT Pub. No.: WO2017/013418
PCT Pub. Date: Jan. 26, 2017

(65) Prior Publication Data
US 2018/0304106 A1    Oct. 25, 2018

(30) Foreign Application Priority Data
Jul. 20, 2015   (GB) ..................................... 1512730

(51) Int. Cl.
*A62B 17/00*    (2006.01)
*A62B 17/04*    (2006.01)
(Continued)

(52) U.S. Cl.
CPC .......... *A62B 17/006* (2013.01); *A62B 17/001* (2013.01); *A62B 17/04* (2013.01);
(Continued)

(58) Field of Classification Search
CPC ... A62B 17/003; A62B 17/006; A62B 17/001; A62B 17/04; A62B 18/02; A62B 18/025;
(Continued)

(56) References Cited

U.S. PATENT DOCUMENTS 1,033,047 A * 7/1912 Cabelinsky ........................ 2/84
1,485,392 A * 3/1924 Halek ...................... A41D 3/02
2/84
(Continued)

FOREIGN PATENT DOCUMENTS

DE        10327994      1/2005
DE     202004019969    2/2005
(Continued)

OTHER PUBLICATIONS

WO PCT/GB2016/052173 Search Rept., dated Sep. 29, 2016, Devol Kitchens Ltd.
(Continued)

*Primary Examiner* — Khaled Annis
*Assistant Examiner* — Dakota Marin
(74) *Attorney, Agent, or Firm* — Wells St. John P.S.

(57) ABSTRACT

A personal protection suit has a selectively sealable hood (1) for protection against CBRN threats. In one series of embodiments, the hood (1) is separable from a jacket body (5) by a releasable attachment means (11), and has a mask hood seal (2) for sealing with a mask. In one series of embodiments the hood (1A) has a deployable face mask (60) stored within the hood (1A). The hood (1) can be removed without breaking the seal between the mask and mask hood seal (2) to minimise contamination during donning and doffing.

14 Claims, 6 Drawing Sheets

(51) Int. Cl.
　　　　A42B 3/22　　　　(2006.01)
　　　　A62B 18/02　　　(2006.01)
　　　　A42B 3/10　　　　(2006.01)
(52) U.S. Cl.
　　　　CPC .............. A42B 3/105 (2013.01); A42B 3/22
　　　　　　(2013.01); A42B 3/225 (2013.01); A62B
　　　　　　17/003 (2013.01); A62B 18/02 (2013.01);
　　　　　　A62B 18/025 (2013.01); B32B 2571/00
　　　　　　　　　　　　　　　　　　　　(2013.01)
(58) Field of Classification Search
　　　　CPC ........... A42B 3/22; A42B 3/225; A42B 3/105;
　　　　　　　　　　　　　　　　　　　　B32B 2571/00
　　　　USPC ... 2/9, 202, 457, 84, 79, 424, 410, 455, 456
　　　　See application file for complete search history.

(56) References Cited

U.S. PATENT DOCUMENTS

| | | | | |
|---|---|---|---|---|
| 1,626,288 | A * | 4/1927 | Lane | A41D 3/00 2/84 |
| 1,972,585 | A * | 9/1934 | Arst | A41D 3/08 2/84 |
| 2,002,955 | A * | 5/1935 | Lipson | A41D 3/00 2/84 |
| 2,103,608 | A * | 12/1937 | Blauer | A41D 3/00 2/84 |
| 2,129,454 | A * | 9/1938 | Wilkie | A41D 3/00 2/84 |
| 2,170,339 | A * | 8/1939 | Reeves | A41D 3/00 2/84 |
| 2,372,110 | A * | 3/1945 | Noone | A41D 3/08 2/84 |
| 2,439,382 | A * | 4/1948 | De Grazla | A42B 1/048 2/84 |
| 2,834,966 | A * | 5/1958 | Zimmerman | A41D 27/18 2/84 |
| 3,130,416 | A * | 4/1964 | Mitchell | A41D 13/0012 2/79 |
| 3,147,490 | A * | 9/1964 | Allen | A41D 15/005 2/84 |
| 3,736,595 | A * | 6/1973 | Siegmann | A41D 13/1218 2/457 |
| 4,042,976 | A * | 8/1977 | Reynolds | A41D 23/00 2/135 |
| 4,320,538 | A * | 3/1982 | Saft | A41D 15/007 2/102 |
| 4,347,629 | A * | 9/1982 | Itoi | A41D 3/00 2/108 |
| 4,473,614 | A * | 9/1984 | Hockmeyer | A62B 17/001 442/238 |
| 4,606,078 | A * | 8/1986 | Tkacsik | A41D 1/20 2/102 |
| 4,619,254 | A * | 10/1986 | Moretti | A62B 17/04 128/201.23 |
| 5,182,812 | A * | 2/1993 | Goldsby | A61H 36/00 2/227 |
| 5,357,635 | A * | 10/1994 | Lemoine | A41D 13/001 2/173 |
| 5,713,077 | A * | 2/1998 | Humbrecht | A41D 13/1153 2/108 |
| 6,006,360 | A | 12/1999 | Reed | |
| 6,263,509 | B1 * | 7/2001 | Bowen | A41D 13/05 2/108 |
| 6,370,692 | B1 * | 4/2002 | Duyn | A41D 3/02 2/86 |
| 6,687,919 | B2 * | 2/2004 | Dilworth, Jr. | A41D 13/12 2/457 |
| 6,874,162 | B2 * | 4/2005 | Boezi | A41D 3/00 2/84 |
| 6,907,618 | B2 * | 6/2005 | Rausch | A41D 13/012 2/69 |
| 7,028,345 | B2 * | 4/2006 | Waldman | A41D 27/18 2/468 |
| 7,058,981 | B2 * | 6/2006 | Clark | A41D 3/00 2/69 |
| 7,779,485 | B2 * | 8/2010 | Gandy | A41D 3/00 2/202 |
| 8,074,299 | B2 | 12/2011 | Brookman | |
| 8,631,516 | B2 | 1/2014 | Hofmann | |
| 10,104,921 | B2 * | 10/2018 | Tuffery | A41D 13/002 |
| 10,265,553 | B2 | 4/2019 | Boss et al. | |
| 2003/0135916 | A1 * | 7/2003 | Hexels | A62B 17/00 2/457 |
| 2004/0060102 | A1 | 4/2004 | Brookman | |
| 2006/0117470 | A1 | 6/2006 | Hofmann | |
| 2006/0143795 | A1 * | 7/2006 | London | A42B 1/201 2/202 |
| 2008/0196145 | A1 * | 8/2008 | Grilliot | A42B 1/046 2/202 |
| 2008/0216218 | A1 * | 9/2008 | McKinney | A62B 17/006 2/457 |
| 2008/0271221 | A1 * | 11/2008 | Zmigrosky | A41D 1/08 2/79 |
| 2009/0100560 | A1 * | 4/2009 | Anderson | A42B 1/048 2/15 |
| 2009/0313747 | A1 * | 12/2009 | Taylor | B63C 9/1055 2/456 |
| 2010/0138983 | A1 * | 6/2010 | Kim | D06M 17/00 427/404 |
| 2011/0094020 | A1 | 4/2011 | Brookman | |
| 2011/0225712 | A1 * | 9/2011 | Rawlings | A62B 17/006 2/457 |
| 2012/0124713 | A1 * | 5/2012 | Blauer | F41H 1/02 2/102 |
| 2012/0131722 | A1 * | 5/2012 | Kang | A42B 1/048 2/84 |
| 2012/0174296 | A1 * | 7/2012 | Martin | A62B 17/006 2/457 |
| 2012/0311763 | A1 * | 12/2012 | King | A41D 3/00 2/69.5 |
| 2013/0340140 | A1 * | 12/2013 | Milhares | A41D 13/012 2/2.16 |
| 2014/0245526 | A1 | 9/2014 | Martin | |
| 2014/0352043 | A1 * | 12/2014 | Harvey | A41D 13/001 2/456 |
| 2015/0181970 | A1 * | 7/2015 | Kuroda | A42B 1/048 2/84 |
| 2015/0202471 | A1 | 7/2015 | Boss et al. | |
| 2015/0327612 | A1 * | 11/2015 | Bublitz | A41D 3/02 2/202 |

FOREIGN PATENT DOCUMENTS

| | | |
|---|---|---|
| FR | 2556226 | 6/1985 |
| GB | 2465612 | 5/2010 |
| WO | WO 2008/118556 | 10/2008 |
| WO | WO 2013/044009 | 3/2013 |
| WO | WO 2013/056774 | 4/2013 |
| WO | WO 2014/029511 | 2/2014 |
| WO | PCT/GB2016/052173 | 1/2018 |

OTHER PUBLICATIONS

WO PCT/GB2016/052173 Writ. Opin., dated Sep. 29, 2016, Devol Kitchens Ltd.
GB GB 1512730.1 Examination Rept., dated Sep. 2, 2019, deVol Kitchens Ltd.
GB 1512730.1 Search Report, dated Dec. 23, 2015, deVol Kitchens Ltd.

* cited by examiner

PERSONAL PROTECTION SUIT

RELATED PATENT DATA

This application is a 35 U.S.C. § 371 of and claims priority to PCT International Application No. PCT/GB2016/052173 which was filed on 19 Jul. 2016, and was published in English, and claims priority to GB Patent Application No. 1512730.1, which was filed on 20 Jul. 2015, the teachings of which are incorporated herein by reference.

BACKGROUND

The following invention relates to personal protective equipment (PPE), specifically protective clothing suitable for protecting a wearer from harmful or toxic substances.

There are many scenarios where individuals need to be protected against Chemical, Biological, Radiological and Nuclear (CBRN) threats, such as for humanitarian, policing and military missions. Personal protection suits are garments designed to protect individuals who are in, or about to enter into, a contaminated environment.

A personal protection suit, and more particularly a CBRN-resistant suit is required to protect the individual whilst allowing maximum movement, optimum durability and sufficient breathability to minimize heat stress and maximise the period a suit can be worn for. With modern advancements in materials and filtering and barrier fabrics, it is now more likely that an individual will become contaminated when removing a contaminated suit, than when operating in a contaminated environment. In some situations it is both safer and simpler to cut the suit from a wearer during decontamination than to properly remove the suit, causing a large volume of wastage.

CBRN suits must be quick to don to maximize the effectiveness of first responders and quick and efficient to decontaminate and remove without risk of contaminating the wearer. It is also desirable for suits to provide a constant level of protection, and thus be suitable for wearing every day.

Seals must accommodate movement the wearer's movement without being compromised and must cover a range of body sizes without any reduction in effectiveness.

In conventional barrier suits, the suit construction and fabric do not permit any transfer of material through the suit. While effective at preventing contamination of the wearer, such suits do not permit air or even sweat to exit the suit, and thus can quickly become hot and stifling.

It is an aim of the present invention to provide a personal protection suit which mitigates or ameliorates at least one of the problems of the prior art, or provides a useful alternative.

STATEMENTS OF INVENTION

According to the first aspect of the invention, there is provided a personal protection suit comprising a selectively sealable hood portion. The personal protection suit may be a CBRN-resistant suit.

The phrase "selectively sealable hood portion" is intended to describe a hood portion that is wearable in a sealed configuration, and wearable in a non-sealed configuration. It is intended that the sealed configuration is when the highest level of protection is offered by the suit. For example, in a CBRN-resistant suit, the sealed configuration may provide the maximum resistance to CBRN threats. By selectively, it is intended to mean the wearer can select which configuration to wear the hood, and preferably to be able to switch between the two states without external assistance.

The selectively sealable hood portion may comprise a releasably detachable hood portion.

The releasably detachable hood portion may be attached to the suit by way of one or more releasable attachment means. The releasable attachment means may provide a seal to seal the hood to the rest of the personal protection suit. The releasable attachment means may comprise a zip or zips. The zip or zips may comprise a double-ended zip and/or have more than one zip pull. The hood may further comprise a releasable attachment means guard portion, which may be positioned on or over the releasable attachment means to provide a CBRN-material resistant seal. The guard portion may comprise a continuous flap to cover the zip along the zip's length e.g. to provide additional protection to the user.

The releasable attachment means may extend from a first position on the front of the suit, around the neck of a wearer to a second position on the front of the suit, which may be adjacent the first. The releasable attachment means may encircle, or extend substantially around a neck opening of the suit.

The first and second positions may be located on a chest portion of the personal protection suit. The suit may further comprise a secondary releasable attachment means between the ends of the releasable attachment means. The secondary releasable attachment means may be provided between terminal ends of the attachment means in order to provide a continuous seal around the entire circumference of the hood. The secondary releasable attachment means may comprise one or more of zips, buttons, poppers, hook and loop fasteners or any other suitable attachment means and combinations thereof.

The first and second positions being located on the chest of the suit/wearer is advantageous, since it means the seal is located away from the wearer's neck. In conventional personal protection suit, the neck region is highly vulnerable. This if often a location where multiple zips or seals terminate, and thus hazardous material may ingress between the zips or seals. By moving the seal away from the wearer's neck and onto their chest and/or shoulders, an overlap is provided. Any hazardous materials then have to pass through or around two layers of protective material. In embodiments wherein the suit comprises a filtering material, increasing the path length (e.g. by providing a convoluted route) for hazardous material to travel in order to contact the skin increases the likelihood that the material will be filtered out, or even unable to reach the wearer's skin.

The releasably detachable hood portion may be movable between a relaxed position and a deployed position, for example, by pulling the hood over a wearer's head. The hood portion may be attached to the personal protection suit by the releasable attachment means while in the relaxed position. The releasable attachment means may be partially engaged while the hood is in the relaxed position. For example, the hood may be attached by a central portion of the releasable attachment means. For example, the releasable attachment means may comprise a double-ended zip wherein the two zip pulls are partially engaged e.g. at a central portion of said double-ended zip. The releasably detachable hood portion may be moved from a relaxed position and a deployed position by pulling the hood over a wearer's head, for example from behind the wearer's head, and fully engaging the partially engaged releasable attachment means.

The hood may comprise an aperture through which a wearer may see. The aperture may comprise a seal around the circumference thereof configured to seal with, to or around a wearer's face. The seal may be configured to seal with to or around a full or partial face-mask, goggles, respirator, communications gear, helmet and/or other head gear.

The suit may comprise a hood storage pouch for storing the hood when not in use. The hood storage pouch may comprise an elasticated portion for retaining the hood therein. For example, the elasticated portion may comprise the hem or rim of the pouch. Alternatively, the hood storage pouch may be closed by any one or more means selected from the following group: buttons, poppers, fasteners, zips, hook and loop fasteners. The hood storage pouch may be located adjacent the neck or collar portion of the suit.

When in the stored position, the hood may be attached to the jacket by a central portion of the releasable attachment means. For example, this may be the central portion of a zip. The central portion may be positioned behind the wearer's head, so that, to don the hood, the wearer pulls the hood forward over his head.

The releasable attachment means may be fully detachable so that, to remove the hood, the wearer undoes the releasable attachment means and detaches the hood. The attachment means may be undone from one end. Undoing the attachment means may release all of one side and the rear of the helmet from the suit. The releasable attachment means may be configured so that to remove the hood, the wearer pulls the hood forward over the face from the rear of the head to the face.

This configuration is particularly favourable, since removing the hood forwards over his face minimises the stress on any seal between a face mask and the wearer's face. Thus, during decontamination, the likelihood of the wearer inhaling or their skin contacting hazardous materials is minimised. Further, the suit is not pulled across the face as it is removed, reducing the chance of contamination.

The sleeves of the personal protection suit may comprise one or more seal at the wrists/cuffs to prevent material ingress. One or more of the seals may be configured to seal with, to, or around a glove or mitten.

The ankles of the trousers may comprise one or more seals to prevent material ingress. One or more of the seals may be configured to seal with, to, or around a boot or overboot.

In one series of embodiments, there is provided a personal protection suit comprising a face mask portion for selectively sealing an aperture in the hood portion.

The face mask portion may comprise a sealing means around its periphery for sealing with the periphery of the aperture of the hood portion.

The face mask portion may be deployable. For example, the face mask portion may be moved from a stored position where the face mask portion does not seal the hood portion, to a deployed position, wherein the face mask portion seals the aperture in the hood portion.

The personal protection suit may comprise a face mask portion as described above in addition to, or as an alternative to, the releasably detachable hood portion as described previously. In one series of embodiment, the hood portion is permanently attached e.g. it may comprise an integrated hood portion. The integrated hood portion may be permanently affixed to the neck portion of a jacket portion of the personal protection suit. The integrated hood may be a conventional hood shape, for example for protecting a wearer from wind and rain. The hood may be storable in a hood storage pouch as described previously, for example, when not in use.

The face mask portion may be storable within the hood portion when the face mask portion is not in use. The face mask portion may be stored in a mask pouch. The face mask may be stored behind and/or above the wearer's head when the hood portion is being worn. The face mask portion may be not visible while stored when the hood portion is being worn.

One or both of the face mask portion and the hood portion may comprise a face mask sealing means for sealing the face mask portion with the hood and/or suit. The face mask sealing means may comprise any one or more of rubber seals, compression seals, zips, hook and loop fasteners, buttons and poppers, drawstrings, or any other suitable means for sealing the face mask portion with a hood portion. At least part of the edge of the face mask portion may be permanently attached to the hood portion. For example, the face mask portion may be permanently attached to the hood portion by a peripheral edge of the mask portion e.g. by stitching. The mask portion may be connected at or adjacent the peripheral edge of the hood, adjacent the wearer's forehead.

The face mask portion may comprise an aperture as described previously. The aperture may comprise a second sealing means around the circumference thereof configured to seal with, to or around a wearer's face. The second sealing means may be configured to seal with to or around a full or partial face-mask, goggles, respirator, communications gear, helmet and/or other head gear.

The face mask portion may be storable within the hood portion when the face mask portion is not in use. The face mask portion may be stored in a mask pouch. The face mask may be stored behind and/or above the wearer's head when the hood portion is being worn. The face mask portion may be not visible while stored when the hood portion is being worn.

When the wearer wishes to don the face mask portion, they pull the hood over their head, if they have not already done so, and can pull the facemask forwards from its stored position to a position in front of the wearer's face. The wearer can then ensure that the edges of the mask portion are all within the hood portion and the suit so as to provide a continuous seal around the exterior thereof.

If the wearer is required to wear a respirator or other similar face mask, they first don the respirator or face mask before with donning the face mask portion. The wearer is then able to seal the face mask portion to the respirator or face mask by the second sealing means around the aperture.

The personal protection suit may comprise a filtering fabric layer or portion for filtering pollutants from the atmosphere.

The suit may comprise a material comprising a layer or portion of activated carbon. The filtering fabric layer may contain carbon or activated carbon layers and/or particles and/or coatings. The word 'carbon' or term 'activated carbon' is used to mean all types of filtering fabrics including, but not limited to, activated carbon that is woven or knitted, or encapsulated within bead technology. For example, the filtering fabric layer may comprise a fabric impregnated or coated with activated carbon beads.

Additionally or alternatively, the suit may comprise an impermeable fabric e.g. to form a barrier suit or a partial barrier suit. The fabric may be gas and/or liquid impermeable material.

The material may comprise a ripstop fabric e.g. to prevent tears propagating through the material. The word ripstop refers to the type of weave and not the makeup of fibres. The ripstop fibres may be woven with a mix of fibres such as, but not limited to, Poly/Cotton, other natural and/or synthetic fibres and/or a flame retardant fibre for an inherently fire resistant fabric. The ripstop fabric may comprise an outer layer. In some embodiments the suit may comprise an alternative durable outer fabric in place of a rip stop material.

The suit may comprise a layered or laminate material. One of the layers or laminates may comprise an activated carbon layer and/or particle and/or coating as described above. A further layer may comprise a ripstop or durable outer fabric as described above.

The suit may comprise a discrete jacket portion and a discrete trouser portion. The suit may further comprise a discrete hood portion. The suit may also further comprise a discrete face mask portion. The filtering fabric layer or portion may be provided in all or in regions of one or more of the jacket portion, trouser portion, hood portion and face mask. For example, the filtering fabric layer or portion may be provided in all or part of a body portion of the jacket, or in one or more of the limbs of the jacket and trouser portion, or any combination thereof. The jacket portion may comprise a waist seal to seal the jacket with, to or around the waist of the trouser portion. The waist seal may comprise a filtering fabric layer or portion. In some alternative embodiments, the suit may comprise a single-piece garment. In a single piece garment, the activated carbon may be placed in one or more regions of the body and/or limbs or may extend through or substantially within or mounted or coated on all of the material of one or more of those regions the suit. In some embodiments the suit may comprise breathable or permeable portions or panels comprising a filtering fabric layer or portion as described previously and portions or panels of an impermeable barrier material.

According to a second aspect of the invention, there is provided a hood comprising a releasable attachment means for attaching to a personal protective jacket or suit. The hood may be configured for use with the personal protection suit described above. The hood may comprise any fabric material described previously, or combinations thereof. The releasable attachment means may comprise any suitable releasable attachment means, for example, hook and loop fasteners, buttons, poppers, a zip or zips etc. In one embodiment the releasable attachment means comprises a double-ended zip. The hood may comprise a hood portion as described previously. The hood may comprise an aperture. The aperture may comprise a seal around its circumference. The seal may be continuous. The seal may be configured to seal with, to or around a full or partial face-mask, goggles, respirator, communications gear, helmet and/or other head gear. The hood may comprise a face mask portion as previously described. Alternatively, the hood may comprise a face mask attachment means for attaching a face mask portion as described previously.

According to a third aspect of the invention, there is provided a method for donning a personal protection suit comprising the steps of: pulling a hood from a position behind a wearer's head to over the wearers head; and sealing a releasable attachment means around the open end of the hood to attach the hood to said personal protection suit. The step of sealing a releasable attachment means may comprise engaging a zip. The zip may be a double-ended zip. The zip may be partially engaged at a central portion thereof prior to pulling the hood over the wearer's head in order to retain the hood in its initial position. The step of sealing a releasable attachment means may comprise fully engaging a partially engaged zip, for example by moving a zip pull or zip pulls from a central portion to the terminal end or ends of the zip. The method may further comprise positioning a protective portion over the releasable attachment means. The method may further comprise engaging one or more releasable attachment means as previously described in order to form a continuous seal around the wearer's head and/or neck.

The method may further comprise any one or more of: inserting the arms and legs into sleeves and trouser legs of the suit; sealing a first wrist seal around the wrists; donning a protective glove over the first wrist seal; sealing a second wrist seal over the protective glove; covering the wrist seals with an outer sleeve cuff; tightening the cuff by way of a releasable wrist adjustment means; sealing a first ankle seal around the ankles; donning a protective boot or overboot over the first ankle seal; sealing a second ankle seal over the protective boot or overboot; covering the ankles with an ankle portion of the trouser leg; and tightening the ankle portion by way of a releasable ankle adjustment means. The method may further comprise any one or more of; connecting a jacket portion to a trouser portion; sealing a jacket portion over a trouser portion; sealing a waist seal around the wearer's waist; and/or tightening a drawcord to adjust a waist seal around a wearer's waist.

According to a fourth aspect of the invention, there is provided a method for removing a personal protection suit comprising: releasing a releasable attachment means connecting a hood portion to said personal protection suit, and pulling the hood forwards from the head of the wearer. The step of releasing a releasable attachment means may comprise disengaging a zip by moving a zip pull from an engaged to a disengaged position. In some embodiments the zip may comprise a double-ended zip with two zip pulls, and the zip may be disengaged by moving either zip pull from an engaged to a disengaged position.

BRIEF DESCRIPTION OF THE FIGURES

Embodiments of the present invention will now be described by way of example and with reference to the accompanying Figures, in which.

DETAILED DESCRIPTION

Figure 1A:
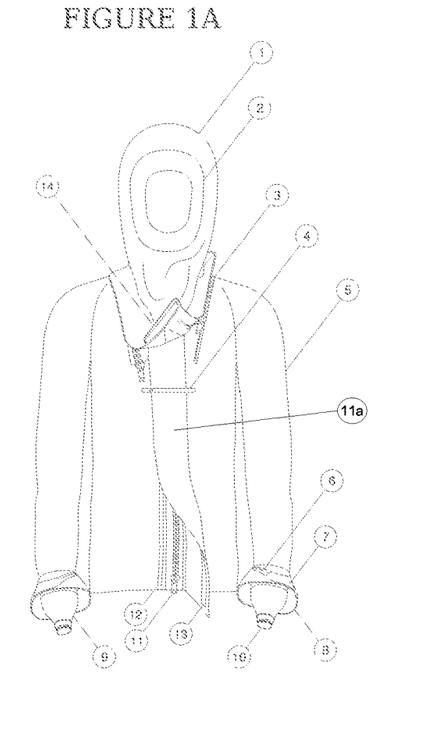
FIG. 1A is a front view of a jacket according to the invention, showing the hood in a deployed position but not sealed.
Figure 1B:
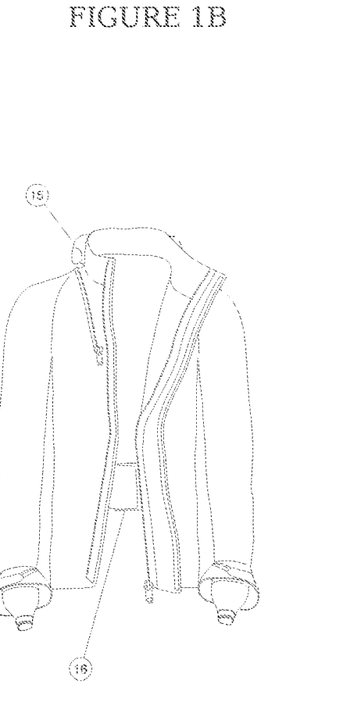
FIG. 1B is a front view of the same jacket while open and with the hood stored.
Figure 1C:
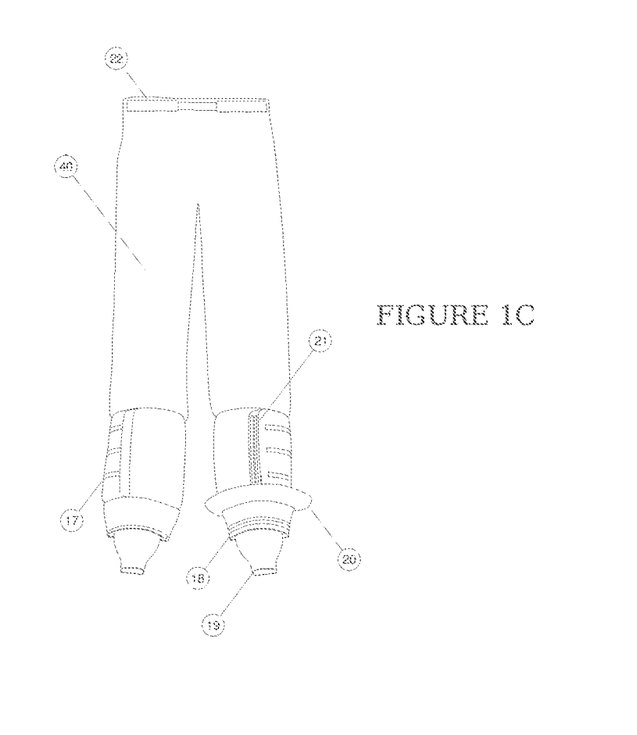
FIG. 1C is a front view of a pair of protective trousers according to the invention.

FIGS. 1A to 1C show a two-piece protective suit according to the invention, with FIGS. 1A and B showing the jacket portion, and FIG. 1C showing the trousers. In some embodiments (not shown) the suit is an integrated one-piece suit, with the jacket portion fixed permanently to the trousers.

The jacket body 5 is a conventional shape with long sleeves ending with double cuffs 8, 9, 10. The jacket is openable on the front and can be closed by the jacket zip 11 and a protective flap 11a which may be positioned over the jacket zip 11 and attached by corresponding hook and loop fastener portions 12, 13. The jacket has a detachable hood 1 which is stored within a hood storage pouch 15 attached to the collar of the jacket when not in use. When the detachable hood 1 is stored in the hood storage pouch 15 (FIG. 1B), the hood 1 is attached at the rear of the jacket collar by the middle portion of an interlocking fastener, in this case the double-ended zip 3.

The double-ended zip 3 extends from a first position on the front chest area of the jacket body, up and around the shoulders and neck of the jacket body and back down to the adjacent front chest area of the jacket to finish in a second position adjacent the first. The zip creates a 'V' shape and does not form a complete loop. Where the two ends of the zip finish, a hook-and-loop fastener 4, 14 is provided between the two ends of the double-ended zip 3 in order to fasten down the hood tab which bridges the jacket zip and jacket zip guard to complete the seal around a wearer's head and neck. This extends the distance that CBRN threats need to travel from the ends of the 'V' zipper to the collar of the jacket. In combination with the hood zip guard, the method of attachment forms a chemical resistant seal.

When the hood is taken out of the collar pocket, the hood can be pulled over the head and mask. Once in place, both zip pulls can be pulled to each end of the zip 3 to fully attach the hood to the jacket. The hood is removable by undoing the zip and the hook and loop fastener 4 to completely separate the hood 1 from the jacket body 5.

The front of the hood 1 has a hole through which the wearer can see and which is surrounded by mask hood seal 2. The integrated mask hood seal 2 creates an unbroken seal between the fabric of the hood and a mask (not shown) to be worn by a wearer. In FIG. 1A a branded hood seal has been used but it is envisaged that alternative seal arrangements could also be used. This allows the hood to be fitted with either generic or mask specific seals to cover a wide range of respirators and applications. In some embodiments (not shown) the hood features a basic seal comprising of an elasticated hem or cord to fit around a mask, still providing an unbroken seal.

The jacket can be used with interchangeable hoods designed to meet specific requirements such as: integrating with specialist headgear or clothing, including but not limited to ballistic or communication head wear. It is envisaged that the hoods could be provided or supplied separately to the jacket so that wearers can select a specific mask hood seal to correspond with their chosen respirator, facemask and/or headgear, thereby providing a further degree of configurability for the purchaser.

In other embodiments, (not shown) the hood will also be available permanently attached to the rear of the jacket so that the donning procedure remains the same but the removal procedure would be carried out as a reverse of the donning procedure.

The jacket body 5 has a waist seal 16 around the inside in order to seal the jacket against the trousers as is described below. The sleeves end in cuffs with three-layer wrist seals 8, 9, 10 in order to prevent ingress of hazardous material up the sleeves.

FIG. 1C shows a pair of trousers 40 according to the invention which have an adjustable waist band 22 which is described further below with reference to FIG. 2. The ankle ends also have a three-layer seal 18, 19, 20 similar to that of the sleeves in order to prevent ingress via the ankles.

Figure 2:
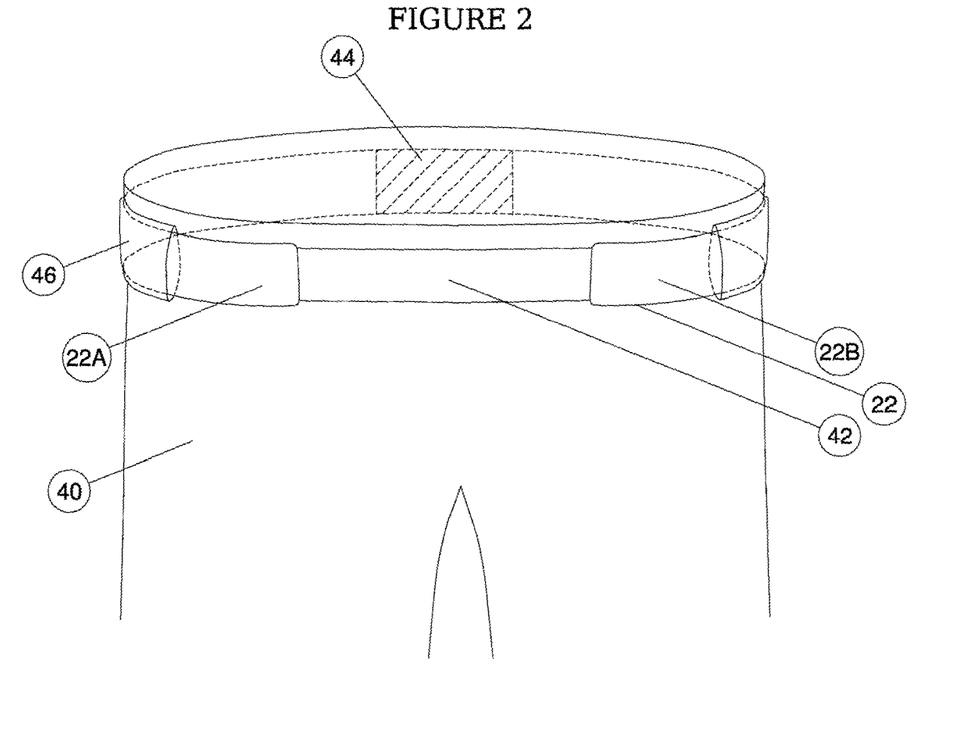
FIG. 2 is a partial front view of the trousers showing the waistband.

In FIG. 2, the adjustable waist band 22 of the trousers 40 is more clearly displayed. The waistband 22 extends around the upper portion of the trousers 40 and passes around a wearer's waist. The waistband 22 is joined by a stretchy elasticated panel 44 on the rear side of the trousers to provide a degree of flex is the waistband. The waistband sits within a sleeve 46 which runs around the rear of the trousers to ensure that the waistband stays in position. The inner surface of the two terminal ends of the waistband 22A, 22B are provided with a hook and loop fastener on the internal surface, to attach to a corresponding panel of hook and loop fastener 42 on the front side of the trousers. When the wearer dons the trousers, he is able to adjust the waistband to tighten or loosen the waist as necessary to ensure the trousers are held close against he body to form a satisfactory seal without compromising comfort.

The protective suit is advantageous, since it can be worn in three stages of readiness, with the final stage offering full protection. These states ensure that transition into full protection is quick. In the "relaxed" configuration, the jacket is open or closed with the hood housed within the collar hood pocket. Gloves, mask and over boots would not be worn.

At the "alert" stage the jacket is fastened at the front and the hood is extracted from the pocket and ready to be pulled over the head. Gloves and over boots would be worn with the mask ready to be donned when needed. In the final "full protection" stage, the mask, gloves and boots are all worn, the hood is fully connected to the jacket and mask and the arm and leg cuffs and the waist band are all sealed.

The suit is made from a material incorporating a filtering fabric layer to filter pollutants from the atmosphere. The filtering fabric layer contains carbon or activated carbon layers or particles. The word 'carbon' or term 'activated carbon' is used to mean all types of filtering fabrics including, but not limiting to, activated carbon that is woven or knitted. It could also refer to carbon coatings.

The material is a ripstop fabric in order to prevent tears propagating through the material. The word ripstop refers to the type of weave and not the makeup of fibres. The ripstop fibres could be woven with a mix of fibres such as, but not limiting to, Poly/Cotton, other natural and/or synthetic fibres and/or a flame retardant fibre for an inherently fire resistant fabric. In some embodiments (not shown) the suit uses an alternative durable outer fabric in place of a rip stop material.

The seams are illustrated as flat seams but this does not limit the construction to this type of seal; the seams can be joined using methods such as, but not limiting to, sewn and taped, taped only, or high frequency welded.

Figure 3:
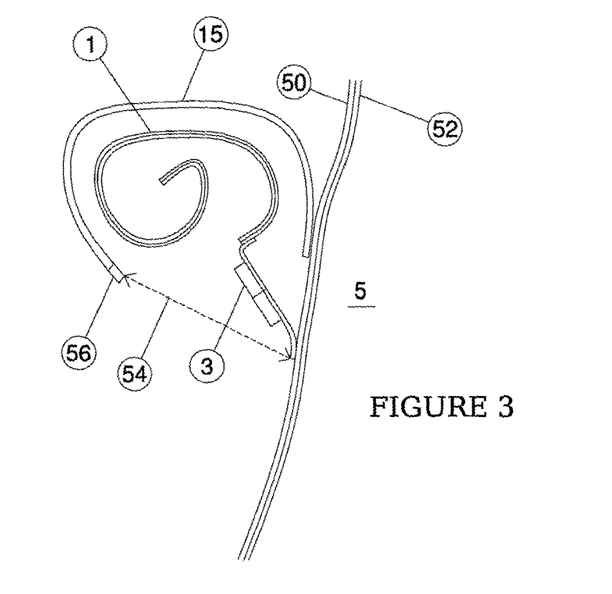
FIG. 3 is a cross-section through the hood of the jacket while in the stored position.

Turning now to FIG. 3, the detachable hood 1 is shown in cross-section while stored within the hood storage pouch 15. As is shown, the jacket body 5 is formed from two layers of material. The exterior layer 50 is a ripstop material, preferably a poly/cotton material to provide a hard wearing and water-resistant outer layer. The inner later 52 comprises an activated carbon material, such as a woven or knitted carbon material. The inner layer thus filters out any harmful substances that permeate through the exterior layer.

Also shown is the hood 1 housed within the pouch 15. The hood 1 is attached to the jacket body 5 by way of the zip 3 and is rolled in a spiral in order to keep it stored and to prevent snagging. The rolled hood 1 is simply inserted through the opening 54 in the underside of the pouch 15 in order to store it, and is retained in place due to an elasticated hem 56 running around the edge of the pouch 15. The elasticated hem thus keeps the opening 54 small and prevents the hood from falling out, but does not prevent the hood from being deployed when needed. The elasticated hem is preferable, since it can be easily dislodged by a wearer with gloved hands and does not require the wearer to grip a tab or undo buttons, both of which actions can be difficult whilst wearing thick chemical-resistant gloves. In other embodiments (not shown) the pouch may be sealed by zips, buttons, popper, hook and loop fasteners etc.

Figure 4:
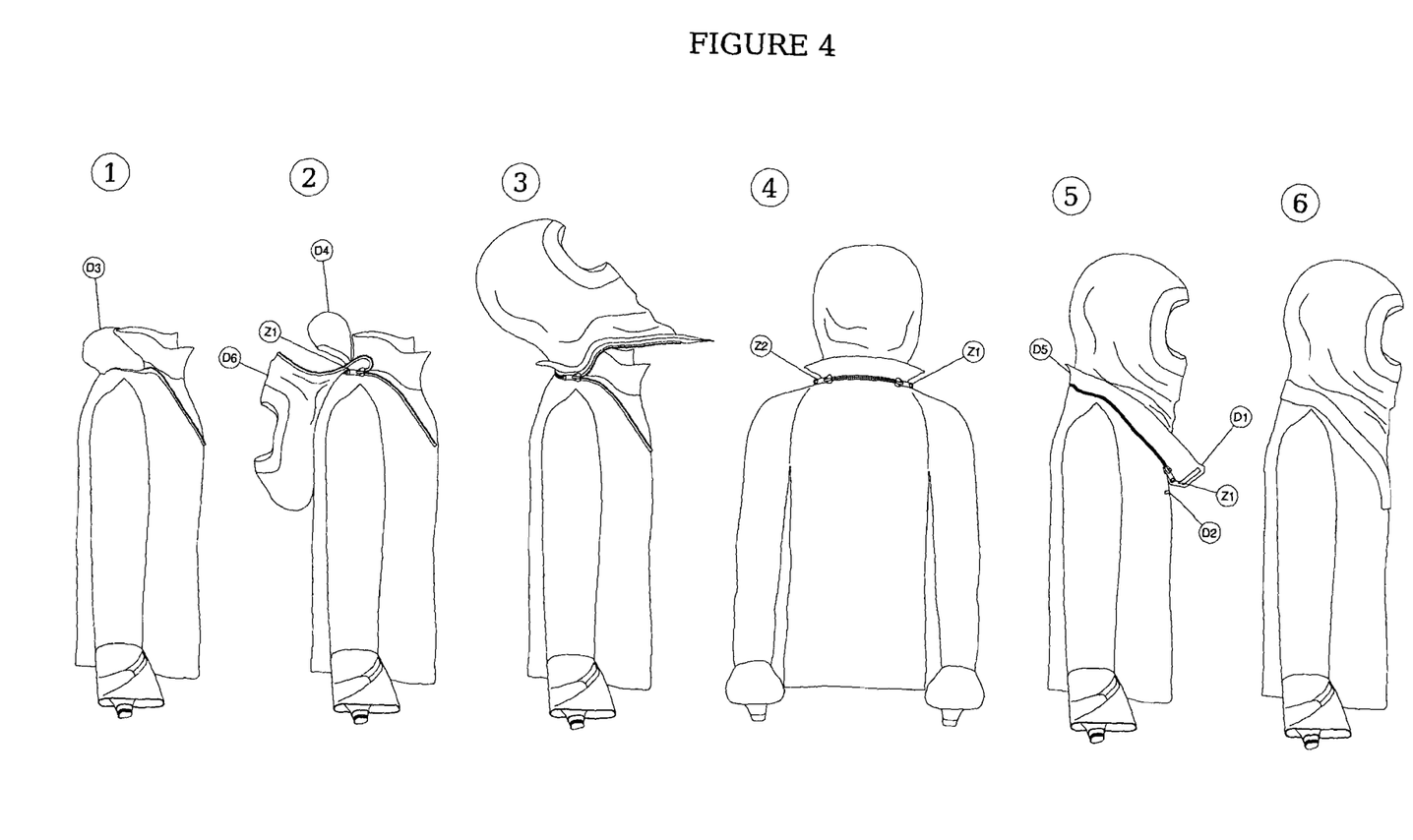
FIG. 4 shows the sequence of events for deploying and sealing the hood portion prior to use.

Turning now to FIG. 4, there is shown the procedure for removing the hood from its storage pouch and donning it ready for use. The donning procedure goes through 6 stages:
1. The hood is stored in collar pocket D3.
2. The hood D6 is then removed from collar pocket D3.
3. The wearer grasps the front edge of the hood and pulls it over the head and mask.
4. The two zipper pulls Z1, Z2 are now pulled to the ends of the zip securing the hood to the jacket, as illustrated in drawing 5.
5. The hood D6 is now secured, but the seal is not complete.
6. The hood tab D1 can now be fastened to jacket D2 by a hook and loop fastener such as Velcro® and the hood zip guard D5 is folded down over the zip to complete the seal.

Figure 5:
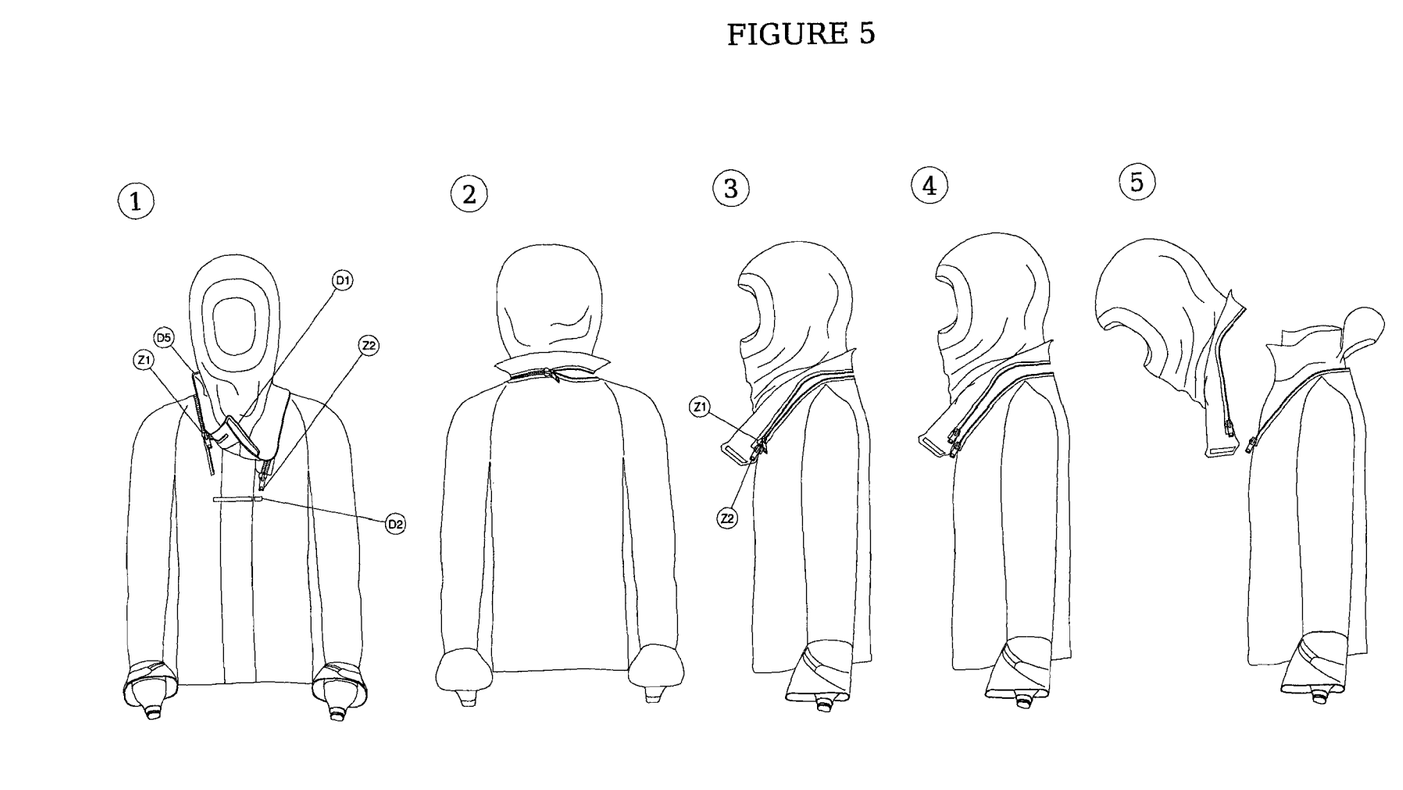
FIG. 5 shows the sequence of events for removing the hood portion after use.

Turning now to FIG. 5, there is shown the procedure for removing the hood after use. The removal procedure goes through 5 stages:
1. The hook and loop fastener attaching the hood tab D1 to the jacket is detached from the corresponding portion D2 on the jacket.
2. The hood zip guard is raised and zip Z1 undone and pulled around the rear of the hood D6.
3. The zip Z1 continues round to the opposite side of the hood to meet zip pull Z2.
4. The two corresponding portions of the zip are thus detached and the hood D6 is detached from jacket body.
5. The hood D6 is then pulled off forwards from the wearer's head.

By the above donning and removal procedures, the hood can be pulled forward over the head for donning, and enables a continuous unbroken seal to be used between the suit and the mask. It has been identified that using a seal with a join compromises the effectiveness of the sealing around a respirator particularly when the wearer is required to carry out a large range of movements.

The zips used to secure the hood to the body of the jacket ensure a chemical resistant join and offer minimal restriction to movement.

For the purposes of removing the suit after contamination the hood can be separated from the jacket using the double-ended zip and the hood removed/pulled off forwards. This means that a contaminated suit is never pulled back over the face and that minimal stress is placed on the wearer's respirator to face seal during removal. This has the effect of minimizing the risk of contaminating the wearer or other parts of the suit during removal, as well as ensuring that the risk of compromising the seal between the respirator and the wearer's face during removal of the suit is minimized. It is thus possible to completely remove the suit whilst still wearing a full face respirator and thus minimise the chance of inhalation of any potentially harmful substances.

Figure 6:
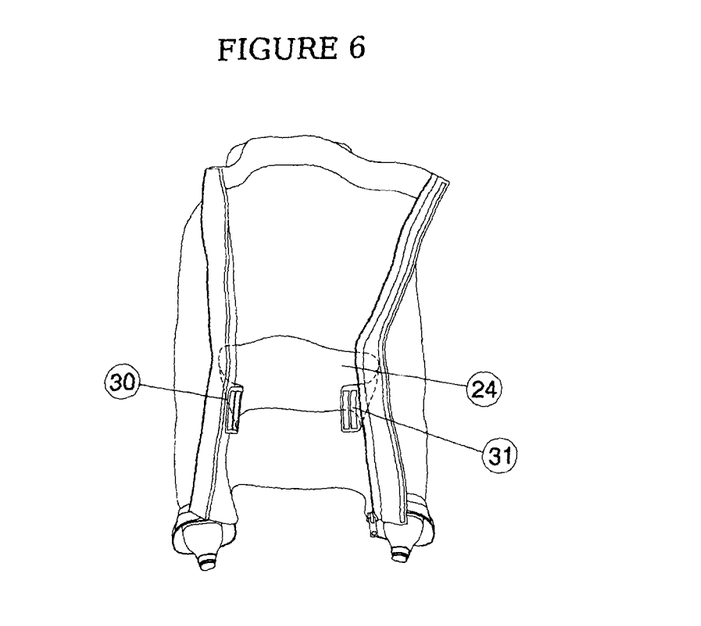
FIG. 6 is a front view of the jacket showing the internal waist loop seal.
Figure 7:
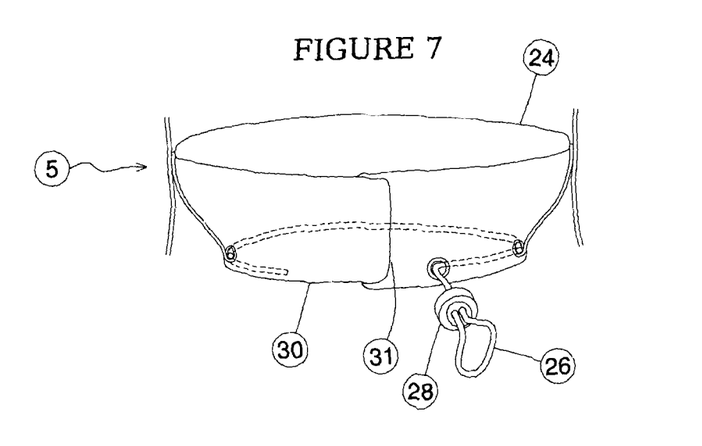
FIG. 7 is a close up showing the internal waist loop seal.

Turning now to FIGS. 6 to 7, there is shown the sealing means for sealing the jacket around the trousers. The inside of the jacket is provided with a waist seal 24, which extends downwards from the jacket waistband. The lower edge of the waist seal 24 is provided with an elasticated drawstring 26 in order to hold the lower edge tight against the wearer's body. The drawstring 26 can be secured by way of a pull toggle 28. The first and second ends of the waist seal 30, 31 are provided with a hook and loop fastener so that the seal can be joined around the waist of the wearer once the jacket has been donned. This provides a continuous seal around the entire waist of the wearer.

The jacket is then tightened around the base of the jacket using a pull toggle and elastic cord. This would tighten over the trousers. The length of the waist seal i.e. from the jacket waistband to the lower edge, allows for the seal to be slack. The slack stops this seal from becoming compromised, for example when the wearer reaches upwards or the jacket is pulled upwards, since the waist hoop would not move on the body, meaning a seal would be maintained in such circumstances.

The waist seal 24 has a layer of activated carbon or activated carbon material. The jacket body 5 further has a layer of activated carbon or an activated carbon material on the interior side of the jacket. The two activated carbon section mean that the torso of the wearer is protected by at least one layer of activated carbon or activated carbon material in all direction, and minimises ingress of any harmful substances.

Figure 8A:
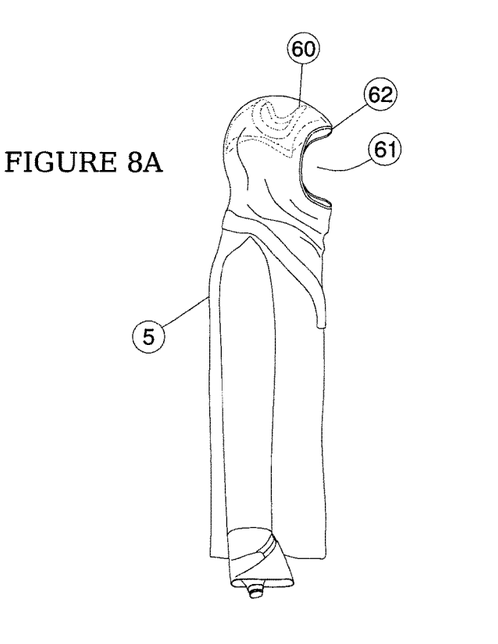
FIGS. 8A and 8B show an alternative embodiment with a face mask portion.
Figure 8B:
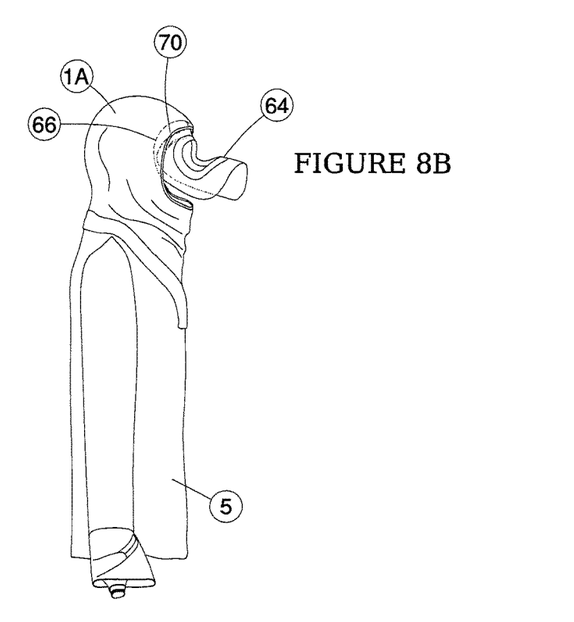

Turning now to FIGS. 8A and 8B there is shown a further embodiment of the invention.

The jacket body 5 is as described previously, with like parts not being described herein. The hood 1A differs from the hood 1 previously described in that it has a large hood aperture 61 at the front face thereof. With the hood aperture 61, the hood 1A is a more conventional shape and can be worn to protect the wearer from the prevailing weather conditions without overly hindering the wearer's vision or range of movement, and without an uncomfortable seal directly against the wearer's face.

The hood 1A is provided with a face mask portion 60. FIG. 8A shows the face mask portion 60 is the housed position, up inside the top of the hood 1A. In use this would be located behind the wearer's head where it would not interfere with them. When the face mask portion 60 is to be donned, the face mask portion 60 is pulled towards and through the hood aperture 61 as shown in FIG. 8B. The face mask portion can then be sealed against both the edge 62 of the hood aperture 61 on the outer edge of the face mask portion 60. The dotted line denotes a region of stitching 66 connecting the face mask portion 60 to the hood 1A in permanent attachment. This both prevents ingress of dangerous materials and retains the face mask portion 60 in position in both the stored and withdrawn positions. Around the remainder of the outer edge of the face mask seal is provided an overlapping region 70, which can be tucked inside the hood 1A to give a continuous seal around the circumference of the hood aperture 61.

The face mask portion 60 is provided with a mask seal 64, in this case a flexible rubber seal. The mask seal 64 can be positioned by the wearer to contact a respirator or other face mask so as to provide a tight seal and prevent ingress of dangerous materials as described previously.

Figure 9:
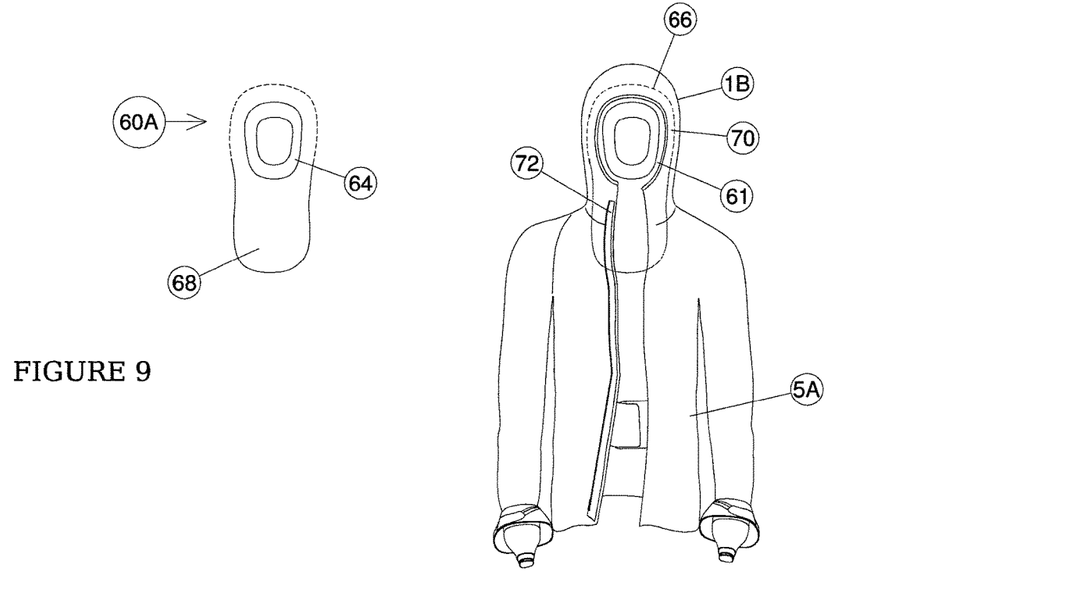
FIG. 9 shows a further embodiment with a face mask portion and an integrated hood.

Turning now to FIG. 9 there is shown a further embodiment. The jacket body 5A is identical to the jacket bodies 5 as previously described, except that the hood 1B is integrated into the jacket and is not detachable. The hood 1B is instead permanently attached to the neck of the jacket body 5A. The hood 1B is provided with a face mask portion 60A which functions in the same manner as face mask portion 60 in FIGS. 8A and 8B, except that it has an extended neck guard portion 68. Because the hood 1B is integrated into the jacket body 5A, there is no sealing means which extends to a position on the wearer's chest. In previous embodiments, this arrangement provides a strong seal and prevents ingress at a region around the wearer's neck that is would otherwise be vulnerable without the additional seal of the hood. Instead, the neck guard 68 of the face mask portion 60 extends down underneath the front zip 72 of the jacket, thereby improving the protection at the vulnerable neck region. During use, the wearer is likely to frequently move their head, and thus the seal at the bottom of the hood is vulnerable. The extended neck guard 68 increases the surface area of carbon filter material at this location at thus lessens the likelihood of wearer contamination.

The embodiments of FIGS. 8A-9 are advantageous when either a variable or a constant low level protection is desirable. Because the hood 1A, 1B has a much larger hood aperture 61, the hood can be used in the conventional manner to protect the wearer from the weather. The embodiment of FIG. 9 can be donned and sealed very rapidly and thus is suited for use in situations where a constant level of protection from dangerous materials is desirable, for example in military situations where a rapid reaction to changing circumstances is required. The embodiment of FIG. 1A is believed to give a level of protection at least equal or superior to conventional products on the market, but with the additional advantages described above. The embodiment of FIGS. 8A and 8B allow for interchangeable hoods for multi-purpose use. The increased adaptability compared to conventional products thereby reduces equipment costs for purchasers who can buy a single suit and select the most appropriate hood portion for the circumstances, rather than being required to purchase and maintain multiple specialist protection suits.

The invention claimed is:

1. A personal protection garment comprising:
   a sealable hood portion, wherein
      the sealable hood portion comprises:
         a face aperture positioned at a front portion of the sealable hood portion and that is configured to permit a user to see outwardly during use of the personal protection garment and the sealable hood portion; and
         a continuous sealing member around a circumference of the face aperture, and wherein the continuous sealing member is configured to seal with a head gear being worn by the user and to prevent entry of fluids into the sealable hood portion; and wherein
      the sealable hood portion is attached to the garment by way of a first releasable fastener, wherein the first releasable fastener comprises a double-ended zip with more than one zip pull, which extends from a first position on a chest of the garment, around the shoulders of the garment and configured to be away from the neck and to a second position on the chest of the garment;
   wherein the garment is configured to be opened on the front;
   further comprising a front releasable fastener configured to close the front of the garment;
   further comprising a protective flap positionable over the front releasable fastener;
   further comprising a secondary releasable fastener provided between the terminal ends of the first releasable fastener on the first and second positions on the chest of the garment and extending across the protective flap, wherein the first releasable fastener and secondary releasable fastener provide a continuous sealed connection between the sealable hood portion and the chest of the garment around the entire circumference of the sealable hood portion, and
   wherein the secondary releasable fastener comprises one or more of: buttons, poppers, or a hook and loop fastener.

2. The personal protection garment according to claim 1, further comprising a face mask portion configured to seal the face aperture in the hood portion.

3. The personal protection garment according to claim 2, wherein the face mask portion is storable within the hood portion.

4. The personal protection garment according to claim 3, wherein the face mask portion is storable behind, above, or above and behind, the wearer's head in use.

5. The personal protection garment according to claim 2, wherein the hood is permanently attached or integrated to a jacket portion of the personal protection garment.

6. The personal protection garment according to claim 1, wherein the hood portion is removed by undoing the first releasable fastener and the secondary releasable fastener, detaching the hood portion, and pulling the hood portion forward over a wearer's face from the rear of his head to the face.

7. The personal protection garment according to claim 1, comprising a filtering fabric layer or portion configured to filter pollutants from the atmosphere.

8. The personal protection garment according to claim 7, wherein the filtering fabric layer or portion comprises one or more of: carbon, activated carbon layers, activated carbon particles and activated carbon coating(s).

9. The personal protection garment according to claim 8, comprising a layered or laminate material and wherein one of the layers or laminate comprises one or more of said: activated carbon layers, activated carbon particles and activated carbon coating(s).

10. The personal protection garment according to claim 1 comprising a gas impermeable material, a liquid impermeable material, or a gas and liquid impermeable material.

11. A method for donning the personal protection garment according to claim 1, the method comprising: pulling a hood from a position behind a wearer's head to over the wearer's head; and sealing the first releasable fastener around the open end of the hood to attach the hood to said personal protection garment.

12. A method for removing the personal protection garment according to claim 1, the method comprising: releasing the first releasable fastener connecting a hood portion to said personal protection garment, and pulling the hood forwards from the head of the wearer.

13. The personal protection garment according to claim 1, wherein the front portion of the sealable hood portion extends continuously around the continuous sealing member.

14. The personal protection garment according to claim 1, wherein the sealable hood portion comprises a continuous panel between the continuous sealing member and the first releasable fastener.

\* \* \* \* \*